US006450377B1

(12) United States Patent
Oriolo

(10) Patent No.: US 6,450,377 B1
(45) Date of Patent: Sep. 17, 2002

(54) GAFFER'S HARNESS

(76) Inventor: Michael Oriolo, 680 Orangeburg Rd., River Vale, NJ (US) 07675

( * ) Notice: Subject to any disclaimer, the term of this patent is extended or adjusted under 35 U.S.C. 154(b) by 0 days.

(21) Appl. No.: 09/867,510

(22) Filed: May 31, 2001

(51) Int. Cl.[7] ................................................. A45F 3/10
(52) U.S. Cl. ....................... 224/266; 224/201; 381/361; 381/362
(58) Field of Search ................................. 224/265, 266, 224/201; 381/361, 362, 364, 366, 368, 385; 352/243

(56) References Cited

U.S. PATENT DOCUMENTS

| | | | | |
|---|---|---|---|---|
| 4,206,983 A | * | 6/1980 | Nettman et al. ............. 224/201 |
| 4,526,308 A | * | 7/1985 | Dovey ......................... 224/185 |
| 4,892,240 A | * | 1/1990 | Bell ............................ 224/153 |
| 4,943,820 A | * | 7/1990 | Larock ........................ 224/265 |
| 4,991,758 A | * | 2/1991 | Eaneff ......................... 224/200 |
| 5,042,763 A | * | 8/1991 | Wong .......................... 224/265 |
| 5,220,704 A | * | 6/1993 | Flynn et al. .................. 15/321 |
| 5,360,196 A | * | 11/1994 | DiGiulio et al. ............ 224/908 |
| 5,435,515 A | * | 7/1995 | DiGiulio et al. ............ 224/908 |
| 5,454,042 A | * | 9/1995 | Drever ........................ 381/361 |

* cited by examiner

Primary Examiner—Stephen K. Cronin
(74) Attorney, Agent, or Firm—Richard A. Joel, Esq.

(57) ABSTRACT

A support for a boom mounted microphone operated by a gaffer comprises a lightweight rigid harness and adjustable couplings, which extend outwardly from the front and rear of the harness to engage the boom. The couplings each include rigid portions extending outwardly from the harness at one end, in an upward direction and a toothed coupling mounted at the other end of the rigid portion. The toothed coupling is pivotable and rotatable. A tension adjustable air cylinder is mounted to each toothed coupling at one end and includes a swing swivel at the other end having a cylinder mounted thereto within which the boom is movably mounted.

11 Claims, 3 Drawing Sheets

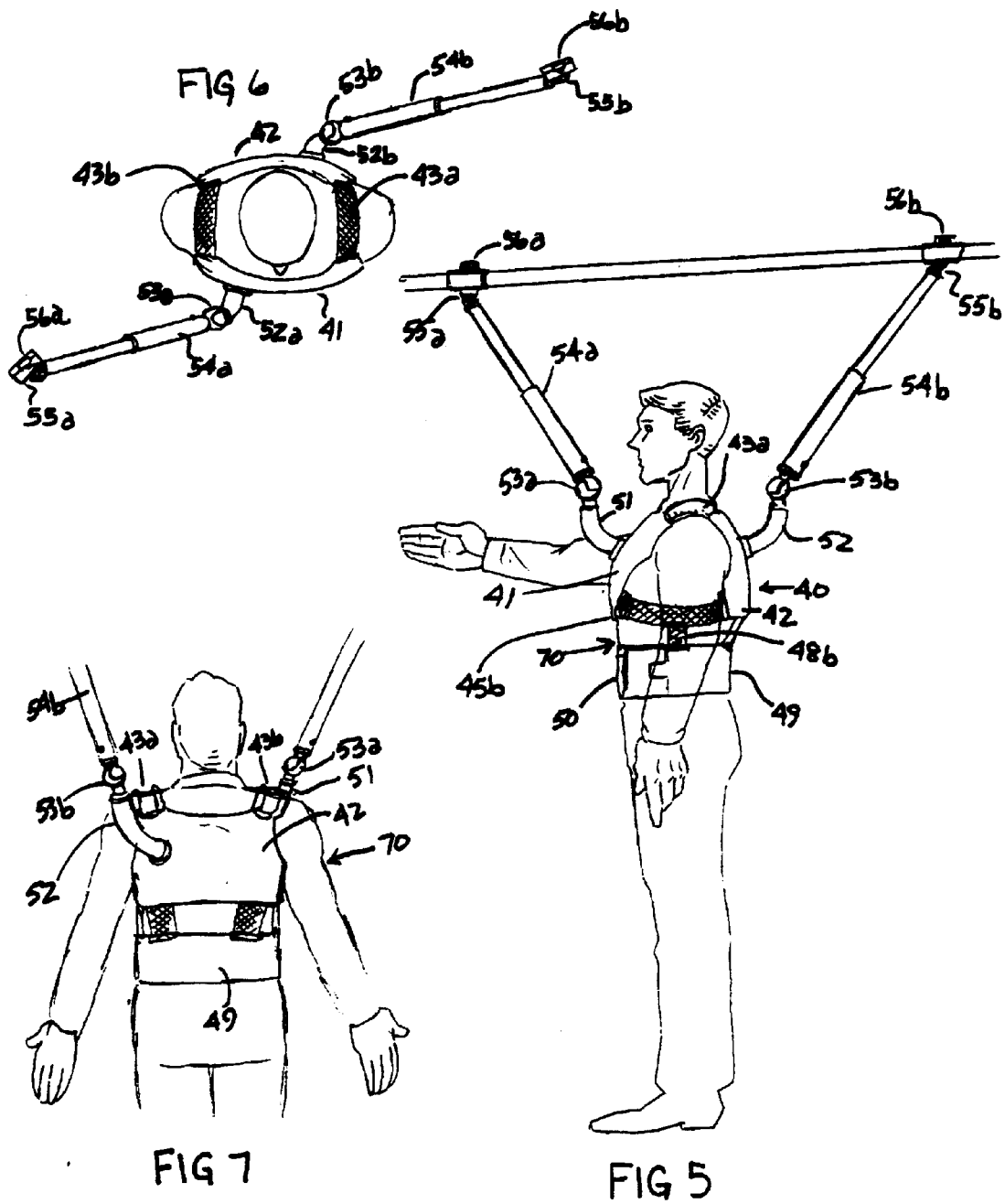

GAFFER'S HARNESS

CROSS-REFERENCE TO RELATED APPLICATIONS

None

STATEMENT REGARDING FEDERALLY SPONSORED RESEARCH OR DEVELOPMENT

Research and development of the present invention and application have not been federally sponsored, and no rights are given under any Federal program.

REFERENCE TO A MICROFICHE APPENDIX

Not applicable.

BACKGROUND OF THE INVENTION

1. Field of the Invention

This invention relates to boom microphones used in filming and particularly to a support to assist gaffers in handling boom microphones.

2. Description of the Related Art Including Information Disclosed Under 37 CFR §§ 1.97–1.98

This invention relates to a support for boom-mounted microphones used by gaffers in filming or television broadcasting. Generally, an individual known as a gaffer, positions a microphone on a boom close to the area of speech but out of picture view. It is an extremely difficult job and often results in back injuries to the gaffer over a period of time. Further, the gaffer finds it difficult to keep the boom out of the camera view as he tires or becomes less attentive during extended shoots.

Everyone is familiar with shows where the microphone boom intrudes into the scene. By the same token, the consequence of being too far away can be poor or uneven sound. Applicant who is in the film industry is not aware of any devices to assist the gaffer in handling the microphone boom. There is an evident need for such devices to eliminate occupational injuries and to improve the quality of the gaffer's job. Holding the boom overhead for extended periods is an extremely difficult job.

SUMMARY OF THE INVENTION

A support for a boom mounted microphone operated by a gaffer comprises a lightweight rigid harness and adjustable couplings, which extend outwardly from the front and rear of the harness to engage the boom. The couplings each include rigid portions extending outwardly from the harness at one end, in an upward direction and a toothed coupling mounted at the other end of the rigid portion. The toothed coupling is pivotable and rotatable. A tension adjustable air cylinder is mounted to each toothed coupling at one end and includes a swing swivel at the other end having a cylinder mounted thereto within which the boom is movably mounted.

In use, a gaffer dons the harness with his head protruding therefrom and adjusts snap straps under his arms. The boom is inserted through the two cylindrical mountings and is slideable therein so that the gaffer who grips the overhead boom with two hands may adjust the boom length. With the swing swivel mounting adjacent the boom, the intermediate toothed coupling which is movable in two directions and the adjustable air cylinders, the boom is supported and is still movable as desired by the gaffer. The tension on the air cylinders may be adjusted while the toothed coupling locks the boom in a temporary position determined by the gaffer. When it is desired to change the position, the gaffer disengages the teeth by lifting the boom and moves the boom to a new position.

Accordingly, an object of this invention is to provide a unique support for a boom microphone held by a gaffer.

Another object of this invention is to provide a new and improved support for a boom microphone which provides movement in all directions under the control of the gaffer.

A further object of this invention is to provide a flexible lightweight support for a boom microphone which includes a gaffer harness and flexible couplings extending therefrom which support the boom and permit the gaffer to move the boom in any direction.

A more specific object of this invention is to provide a unique support for a hand held boom microphone which includes front and rear couplings extending from a gaffer harness and are coupled to the boom to permit movement in all directions while supporting the boom and facilitating the gaffer's control thereover.

BRIEF DESCRIPTION OF THE DRAWINGS

The above and other objects of the invention may be more readily seen when viewing in conjunction with the accompanying drawings wherein:

FIG. 5 is a side view of the alternate embodiment of FIG. 3;

FIG. 6 is a top view of the embodiment of FIG. 3; and,

FIG. 7 is a rear view of the embodiment of FIG. 3.

DETAILED DESCRIPTION OF THE INVENTION

Figure 2:
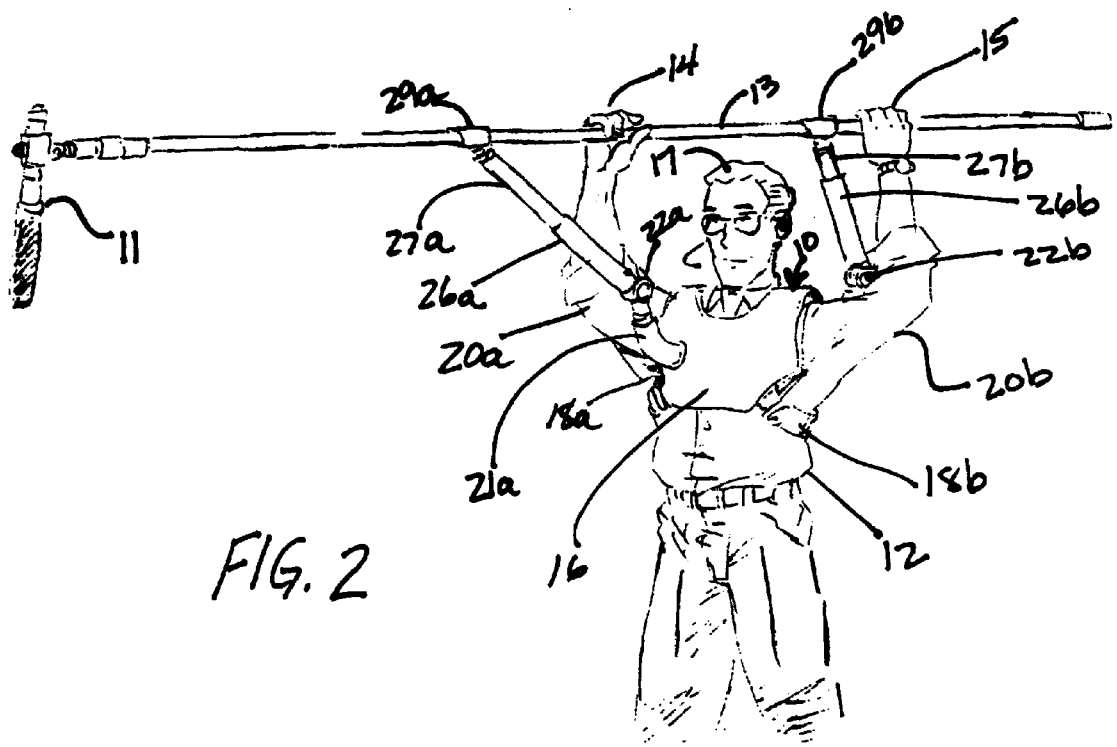
FIG. 2 is a perspective view of the invention in use.
Figure 3:
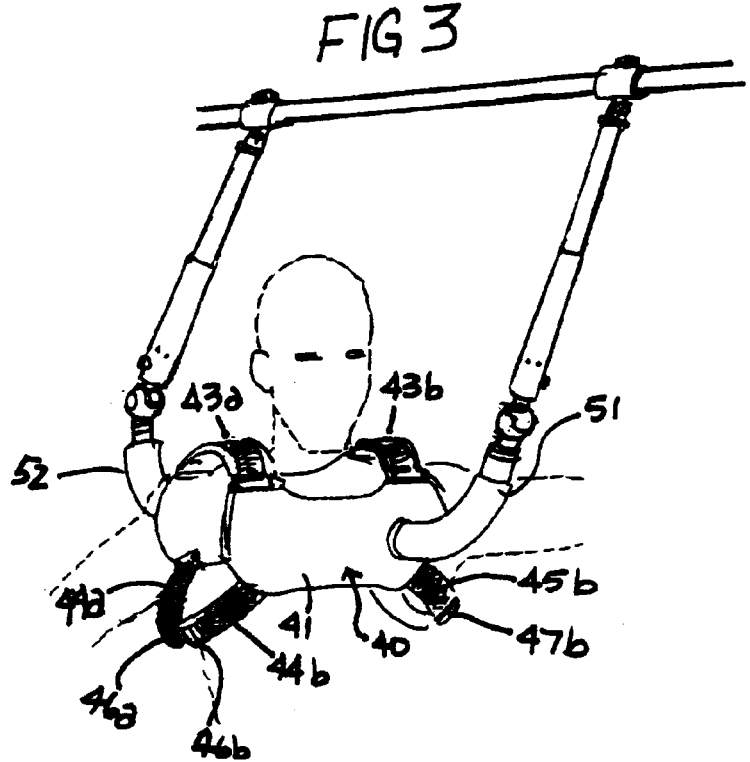
FIG. 3 is a perspective view of an alternate embodiment of the invention.
Figure 4:
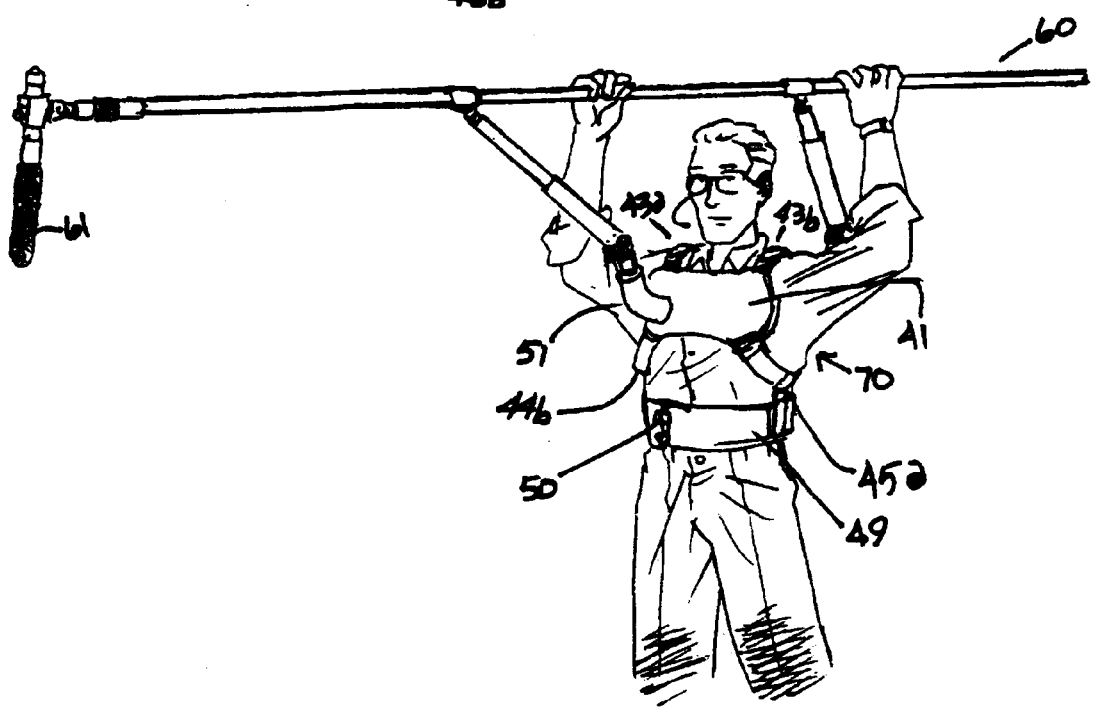
FIG. 4 is a perspective view of the alternate embodiment of the invention in use.

Referring now to FIG. 2 of the drawings, the invention comprises a support 10 for a boom microphone 11 held by a gaffer 12. The microphone 11 is on one end of a long boom 13 ad is held above the gaffer's head 12 with both hands 14 and 15. Without the support 10, gaffers 12 often developed back problems due to the physical demands of holding the microphone 11 high in physically demanding positions often for long periods of time.

In filming and television, it is not altogether uncommon for a boom microphone 11 to unintentionally enter the viewing area. In some cases this may be due to the fatigue of the gaffer 12. On the other hand, being too conservative and keeping the microphone 11 too far back may compromise the sound.

Figure 1:
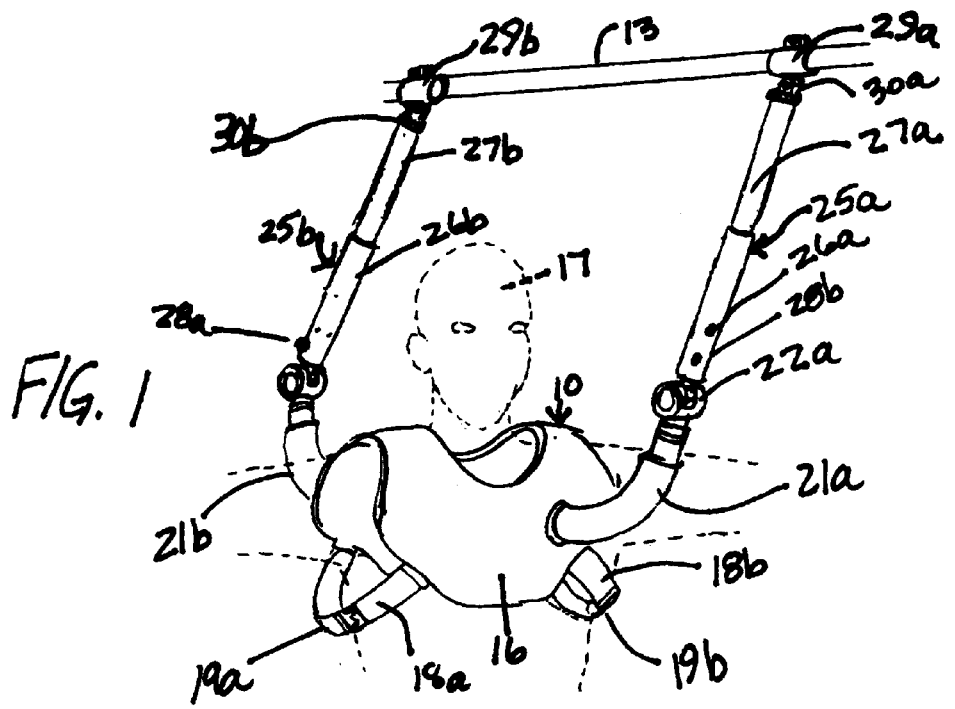
FIG. 1 is a perspective front view of the invention.

The details of the support 10 are more clearly shown in FIG. 1. A lightweight, preferably rigid harness 16 is placed over the gaffer's head 17 and adjustable cloth or plastic straps 18a and 18b with snap locks 19a and 19b are locked under the gaffer's arms 20a and 20b.

Extending upwardly in a convex curve from the harness 16 are two cylindrical support members 21a and 21b. The member 21a is rigid and is located on a central portion of the vest 16 while rigid member 21b is located on the rear of the harness 16. At the outside end of the members 21a and 21b is a toothed coupling 22a and 22b respectively. The couplings 22a and 22b are threadingly mounted to end of members 21a and 22b and can rotate about the particular ends as well as pivot.

A Teflon coated air cylinder 25a and 25b is mounted to each respective member 21a and 22b. The air cylinders 25a and 25b each include a lower cylinder portion 26a and 26b respectively with an upper cylinder portion 27a, 27b telescopically mounted therein to act as an extension bar. A tension adjustment screw 28a, 28b is provided on cylinder 26a, 26b. Thus, the boom 13 may be moved upwardly or downwardly with the operator's grip.

A pair of spaced hollow cylinders 29a and 29b are mounted about the boom 13 with the boom 13 being slideable within said 29a and 29b. The cylinders 29a, 29b are affixed to the boom cylinders 27a and 27b with swing swivels 30a and 30b which permit rotatable motion of the boom microphone 11.

Thus the gaffer 12 is provided with necessary support which eliminates the physical problems which are job-related, and is able to do a better more efficient job.

In the alternate embodiment of FIGS. 3–7, the harness 40 comprises rigid front and rear portions 41 and 42 joined by nylon shoulder straps 43a, 43b and lower connecting straps 44a, 44b and 45a and 45b which are coupled together by mating clips 46a, 46b and 47a, 47b. A belt is positioned about the waist and is joined by the straps 48a, 48b to the straps 44a, 44b and 45a, 45b. The belt 49 is fastened about the waist by a buckle 50 or hooks and loop fasteners.

The front couplers 51 and rear coupler 42 extend upwardly at one end from the respective harness portions 41 and 42 and each include a ball joint 53a and 53b at the other end for a 360° movement. The front coupler 51 is mounted towards one side of the front harness portion 41 while the rear coupler 52 is mounted towards the opposite side of the rear harness portion 42.

Air cylinders 54a and 54b are connected at one end to the respective ball joints 53a, 53b land include swivel couplings 55a, 55b at the other end having hollow cylinders 56a, 56b mounted thereto. The boom 60 has microphone 61 mounted on one end. The gaffer 70 is able to manipulate the boom 60 in any direction while having support provided by the harness 40.

While the invention has been explained by a detailed description of certain specific embodiments, it is understood that various modifications and substitutions can be made in any of them within the scope of the appended claims, which are intended also to include equivalents of such embodiments.

What is claimed is:

1. A support device for boom microphones held by a gaffer comprising:

a harness mounted over the gaffer's head;

a front and a rear rigid coupling portion mounted to the harness and extending upwardly therefrom;

a rotatable coupling mounted at the other end of each rigid coupling portion having a toothed portion therein;

an air cylinder mounted at one end to the toothed portion of each coupling to permit ratcheted movement in a vertical plane;

a swivel connection at the other end of each air cylinder having a hollow cylindrical boom mounting coupled thereto for sliding movement of the boom therein; and, wherein the gaffer support device permits movement of the boom in all directions.

2. A support device for boom microphones held by a gaffer in accordance with claim 1 further including:

mating adjustable snap lock straps mounted on the front and rear of the harness.

3. A support device for boom microphones held by a gaffer in accordance with claim 1 wherein:

the rigid front and rear couplings are mounted centrally on the front and rear of the vest and extend upwardly in a curved configuration.

4. A support device for boom microphones held by a gaffer in accordance with claim 1 further including:

tension adjustment means for the air cylinders.

5. A support device for boom microphones held by a gaffer in accordance with claim 1 wherein:

the rotatable couplings each include a toothed portion to lock the air cylinders in particular positions.

6. A support device for boom microphones held by a gaffer in accordance with claim 1 wherein:

the rotatable coupling comprises a universal.

7. A support device for boom microphones held by a gaffer in accordance with claim 1 wherein:

the harness comprises a rigid lightweight member having a front and a rear spaced therefrom and an upper portion having an aperture for the gaffer's head and side portions to engage the gaffer's shoulders with the front and rear extending downwardly on opposite sides of the gaffer.

8. A support device for boom microphones held by a gaffer in accordance with claim 7 wherein:

the harness comprises a plastic material.

9. A support device for boom microphones held by a gaffer in accordance with claim 1 wherein:

the harness comprises a front portion and rear portion, and a pair of shoulder straps joining said front and rear portions.

10. A support device for boom microphones held by a gaffer in accordance with claim 9 wherein:

a belt positioned about the gaffer and a mounting on each side of said harness connected to the snap lock strap and to the belt.

11. A support device for boom microphones held by a gaffer in accordance with claim 9 wherein:

a rigid coupling is mounted to one side of the front harness portion and a rigid coupling is mounted to the opposite side of the rear harness portion.

* * * * *